United States Patent
Baubet et al.

(10) Patent No.: US 9,416,817 B2
(45) Date of Patent: Aug. 16, 2016

(54) CRANKSHAFT BEARING ASSEMBLY

(71) Applicant: AKTIEBOLAGET SKF, Göteborg (SE)

(72) Inventors: Yannick Baubet, Leiden (NL); Peter Knight, Göteborg (SE); Martines Maria Josef Noordman, Erichem (NL); Lars Stigsjöö, Angered (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/425,213

(22) PCT Filed: Dec. 19, 2012

(86) PCT No.: PCT/EP2012/005257
§ 371 (c)(1),
(2) Date: Mar. 2, 2015

(87) PCT Pub. No.: WO2014/032687
PCT Pub. Date: Mar. 6, 2014

(65) Prior Publication Data
US 2015/0337888 A1  Nov. 26, 2015

(30) Foreign Application Priority Data

Aug. 31, 2012 (WO) .................. PCT/EP2012/003653

(51) Int. Cl.
*F16C 33/58* (2006.01)
*F16C 33/64* (2006.01)
(Continued)

(52) U.S. Cl.
CPC .. *F16C 9/02* (2013.01); *B23H 3/00* (2013.01); *F16C 3/06* (2013.01); *F16C 23/08* (2013.01); *F16C 23/082* (2013.01); *F16C 33/60* (2013.01); *Y10T 74/2173* (2015.01)

(58) Field of Classification Search
CPC ...... B23P 15/003; B23P 2700/07; F16C 9/02; F16C 3/06; F16C 23/082; F16C 33/60; F16C 2220/68; B23H 3/00; B23H 2200/10; B23H 9/18; Y10T 74/2173
See application file for complete search history.

(56) References Cited

U.S. PATENT DOCUMENTS

| | | | | |
|---|---|---|---|---|
| 7,328,681 B2* | 2/2008 | Tidwell | ..................... | F16C 3/14 123/195 R |
| 8,002,473 B2* | 8/2011 | Becker | ..................... | F16C 9/04 384/130 |
| 8,523,452 B2* | 9/2013 | Yamakawa | ................. | F16C 9/04 384/457 |
| 2008/0232732 A1* | 9/2008 | Waseda | ................... | F16C 19/46 384/548 |

FOREIGN PATENT DOCUMENTS

| | | |
|---|---|---|
| DE | 3112303 A1 | 10/1982 |
| DE | 10258884 A1 | 7/2004 |
| EP | 2071204 A2 | 6/2009 |

OTHER PUBLICATIONS

Machine translation of DE 10258884 A1 obtained on Dec. 11, 2015.*

* cited by examiner

*Primary Examiner* — Adam D Rogers
(74) *Attorney, Agent, or Firm* — Bryan Peckjian; SKF USA Inc. Patent Dept.

(57) ABSTRACT

The invention relates to an assembly providing a crankshaft having a shaft section that is rotationally supported by a rolling element bearing having an outer ring that is radially divided into two ring halves. To reduce friction and accommodate misalignment, the invention proposes that the bearing which supports the shaft section is a toroidal roller bearing.

8 Claims, 2 Drawing Sheets

(51) Int. Cl.
*F16C 9/02* (2006.01)
*F16C 3/06* (2006.01)
*F16C 23/08* (2006.01)
*B23H 3/00* (2006.01)
*F16C 33/60* (2006.01)

CRANKSHAFT BEARING ASSEMBLY

CROSS-REFERENCE TO RELATED APPLICATIONS

This application is the U. S. National Stage of International Application No. PCT/EP2012/005257 filed on Dec. 19, 2012, which claims priority to International Patent Application no. PCT/EP2012/003653 filed on Aug. 31, 2012.

TECHNICAL FIELD

The invention relates to a crankshaft assembly comprising one of more shaft sections which are rotationally supported by a rolling element bearing.

BACKGROUND

A crankshaft of a combustion engine, for example, is supported in the engine housing by means of main crankshaft bearings, which are generally sliding bearings. That is, the number of shaft sections by which the crankshaft is supported in the housing has a corresponding number of sliding bearing surfaces in the housing.

It is also known to support the crankshaft in the engine housing by means of rolling element bearings, such as deep groove ball bearings or cylindrical roller bearings.

The advantage of using roller bearings instead of sliding bearings for supporting the crankshaft in the engine housing is that the friction during rotation of the crankshaft can be reduced. On the other hand, the application of rolling element bearings can be detrimental, since misalignment of the bearing arrangement and/or offsets in the shaft sections of the crankshaft due to the crankshaft loading can lead to a significant reduction in bearing life.

Furthermore, when roller bearings are used as main crankshaft bearings, they are prone to noise and vibrations. Due to the geometry of a crankshaft, the bearings have an outer ring consisting of two ring halves, which are split radially. In practice, there is always some radial mismatch at the interface between the two halves, leading to noise and vibration when the interface is over-rolled.

Thus, it is an object of the present invention to propose a bearing solution for a crankshaft assembly, which has a low friction, which places less strict requirements on correct alignment of a single bearing location relatively to another and which minimizes the generation of noise and vibration. As a result, a long bearing life can be achieved.

SUMMARY OF THE INVENTION

A solution according to the invention is characterized in that the bearing which supports at least one of the shaft sections of the crankshaft, relatively to a housing, is a toroidal roller bearing.

The toroidal rollers of the bearing have a radius of curvature R with a defined relationship to a pitch circle diameter D of the bearing. Suitably, $1.5D<R<2.5D$. In an advantageous embodiment, the radius of curvature R of the toroidal rollers is approximately equal to 2D, which had been found to minimize edge stresses at the edges of the rollers.

The inner ring of the toroidal roller bearing can be formed directly by the shaft section of the crankshaft. In this case, the shaft section has at least partially a concave surface forming an inner raceway for the toroidal rollers.

The outer ring of the toroidal roller bearing can be formed directly by a part of the housing, which then has an inner circumferential surface, concave in shape, that forms an outer raceway for the toroidal rollers.

Alternatively, the outer ring of the toroidal roller bearing can be a separate part mounted in a bore of the housing.

The outer ring consists of two ring halves which are split in a radial direction, and which may be joined together by means of e.g. screws. At an interface where the two ring halves meet, adjoining edges of the ring halves are provided with a curved profile. According to a further development of the invention, the curved profile has a logarithmic curvature, formed in an electrochemical machining (ECM) process. The logarithmic curvature minimizes edge stresses at the adjoining edges of the ring halves.

The logarithmic curvature is defined between a start point at the interface and an endpoint on the outer raceway. The start point has a depth relative to the outer raceway that is at least equal to a maximum radial clearance of the bearing. The endpoint has a length relative to the interface, which is at least equal to twice the radial clearance. Consequently, the rollers do not encounter an edge, and noise and vibration are reduced.

The toroidal roller bearing preferably has a maximum radial clearance of between 0.03 mm and 0.08 mm, specifically preferred between 0.045 mm and 0.065 mm.

The rollers of the toroidal roller bearing are preferably held by a cage. The cage can consist of at least two split parts. The cage may be made from a metal material such as brass or of a polymer material such PEEK.

Thus, the invention proposes to support the main bearing of a crankshaft with toroidal roller bearings (known under the trademark CARB from AB SKF) having a split outer ring with logarithmically curved edge profiles at the adjoining edges of the two ring halves.

By this concept, a cost effective roller bearing is obtained with a high reliability.

The following advantages are obtained with the proposed solution:

The friction of the main bearings of the crankshaft assembly is reduced. In the case of a crankshaft of a combustion engine in a vehicle, this helps to reduce the fuel consumption.

The bearing is able to take a dynamic combustion load; this is specifically relevant in the case of a Diesel engine which delivers high loads. The toroidal bearing is self-aligning, meaning that it runs in the optimized loading zone. Furthermore, crankshaft deflections due to the nature of the loading can be accommodated.

The toroidal bearing also operates well with a relatively large radial clearance, which allows any radial offset between the two outer ring halves to be accommodated.

Furthermore, the logarithmically curved profiles minimize edge stresses, as well as reducing noise and vibration.

Consequently, an assembly according to the invention enables friction and noise reduction in combination with increased bearing life.

The proposed design is suitable for combustion engines and compressors, and several of the bearings of the crankshaft bearing arrangement can be designed accordingly.

Not all of the main crankshaft bearings need be executed as toroidal roller bearings, however. In an advantageous embodiment, one of the shaft sections is supported by a cylindrical roller bearing (CRB) or a spherical roller bearings (SRB). The advantage of such a bearing is that it can additionally provide axial thrust bearing functionality.

Other advantages of the present invention will become apparent from the detailed description and accompanying figures.

BRIEF DESCRIPTION OF THE DRAWINGS

The drawings show an embodiment of the invention.

DETAILED DESCRIPTION OF THE INVENTION

Figure 1:
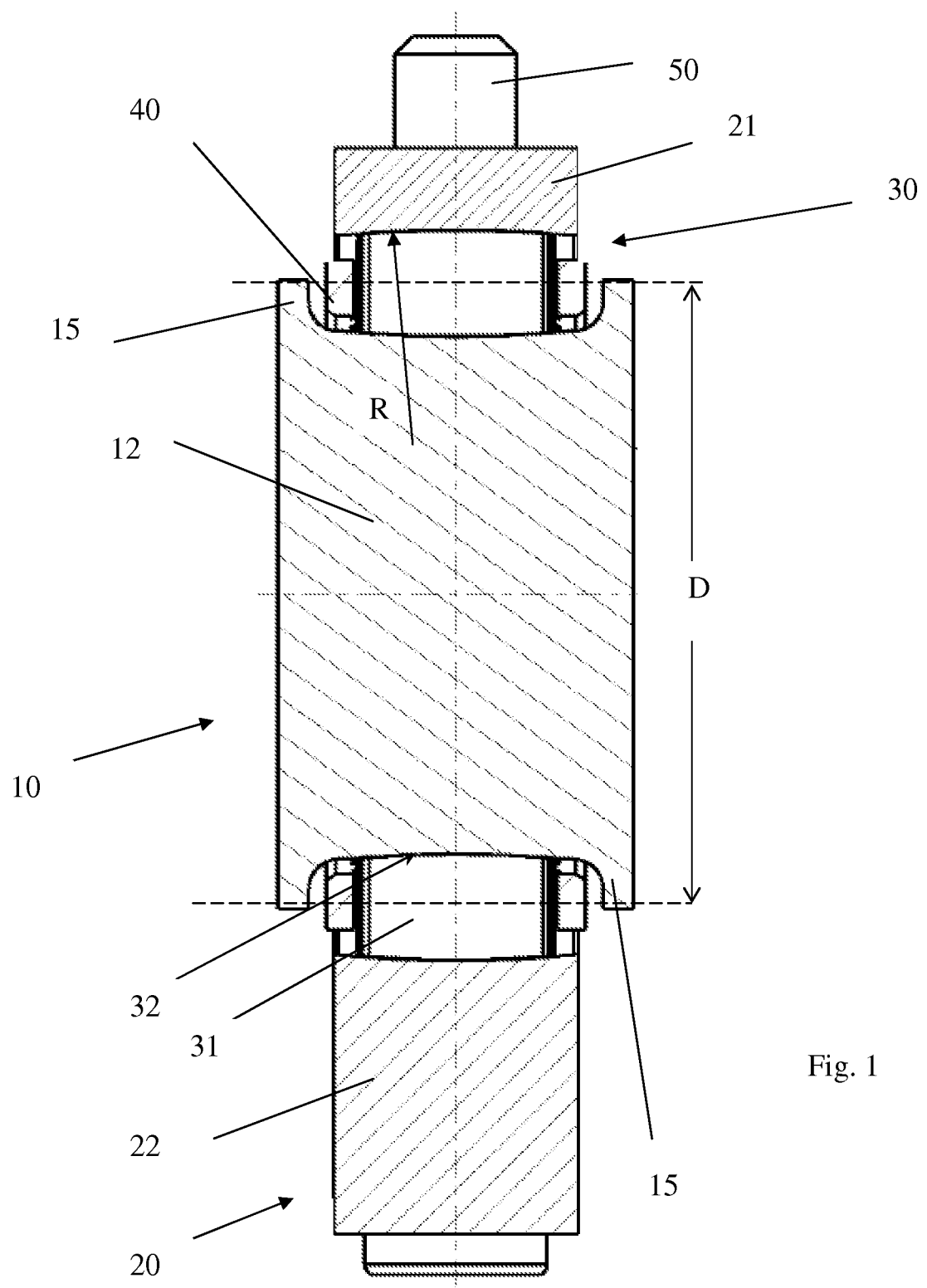
FIG. 1 is a side cross-sectional view through a part of a crankshaft assembly according to the invention, the crankshaft being rotatably supported in a split housing via a toroidal roller bearing.

In the figures, an example of part of a crankshaft assembly is depicted, suitable for use in a vehicle combustion engine. The crankshaft 10 has several shaft sections 12, depending on the number of cylinders of the engine. Each shaft section 12 is rotatably supported in a housing 20 by means of a rolling element bearing. According to the invention, at least one of the bearings which supports a shaft section 12 is a toroidal roller bearing 30, comprising a set of toroidal rollers 31. The toroidal rollers have a convex outer surface, with a radius of curvature R.

Figure 2:
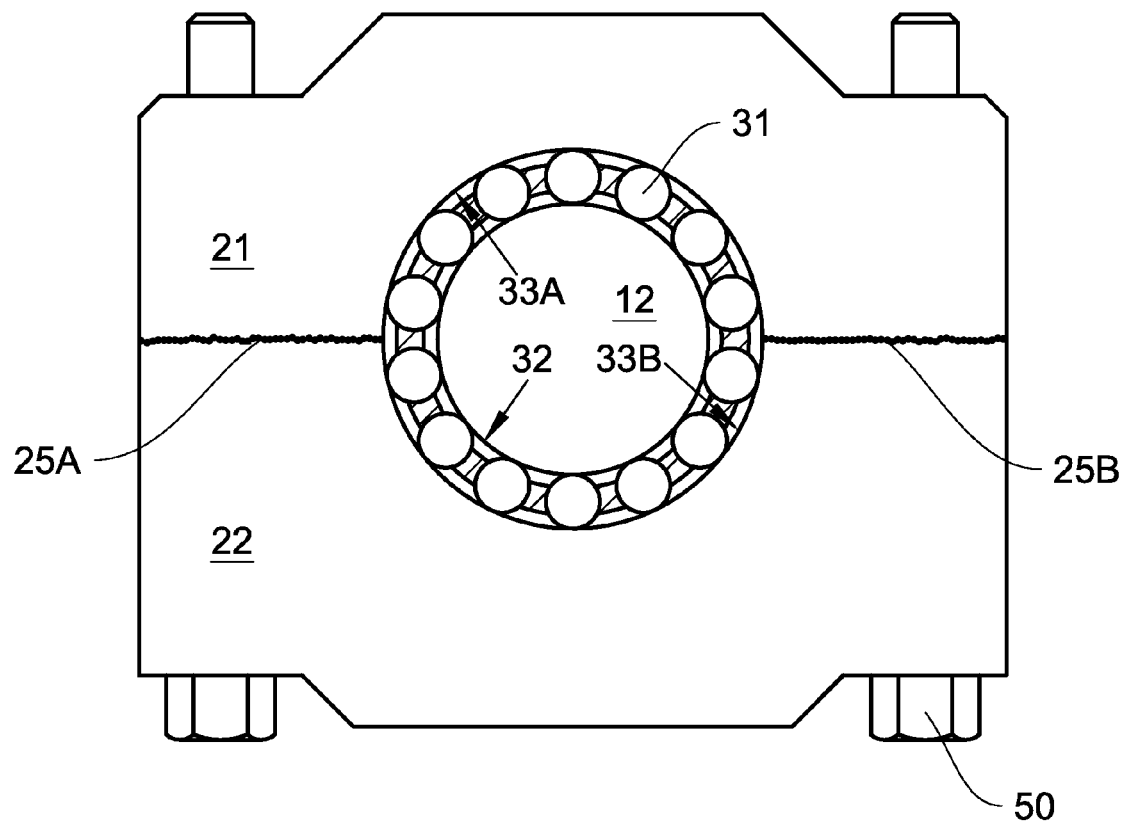
FIG. 2 is a front cross-sectional view of the part of the crankshaft assembly from FIG. 1, showing first and second halves of the split housing

In the depicted example, an inner ring of the bearing 30 is formed by the shaft section 12 itself. A radially outer surface of the shaft section has a correspondingly curved concave shape, and serves as an inner raceway 32 for the toroidal rollers 31. The shaft section 12 is axially delimited by radially extending parts, known as crank webs 15. The webs are depicted in FIG. 1 in a truncated form and in reality extend much further. To enable assembly of the bearing 30, an outer ring of the bearing and the housing are split radially into two halves, as best shown in FIG. 2. The housing has a first part 21 and a second part 22 that are joined together by means of e.g. bolts 50. The two parts adjoin at a first interface 25A and a second interface 25B In this example, the housing 20 also serves as the bearing outer ring. Accordingly, the first and second housing parts 21, 22 have a radially inner surface that is convex in shape and which serves an outer raceway for the toroidal rollers 31. The outer raceway therefore consists of a first portion 33A and a second portion 33B. The rollers are held in position by a cage 40. To permit assembly, the cage is also of split design, whereby the two cages halves may be connected together after assembly, or may remain unconnected. The cage may be made of brass or a polymer material.

The toroidal roller bearing allows a certain maximal axial displacement, in the present case about 3 mm. Also a misalignment can be accepted of up to about 0.5°. The bearing is thus able to accommodate the misalignment which results from the dynamic loading of the crankshaft.

In order to optimize the load distribution across each roller 31, to prevent excessive edge loads at the axial extremities, the radius of curvature of the toroidal rollers 31 has a predefined value with reference to a pitch diameter D of the bearing 30. The pitch diameter is the theoretical median diameter of the bearing, which passes through the center of the rollers 31. Suitably, the radius of curvature R of the rollers is greater than 1.5 D and less than 2.5D. In the depicted example, R is approximately equal to 2D.

The toroidal roller bearing 30 is able to operate with a relatively large radial clearance, the radial clearance being the maximum amount by which the bearing inner ring can be displaced in radial direction relative to the outer ring. In the depicted example, the bearing 30 has a radial clearance of approximately 50 microns. A relatively large radial clearance is beneficial for accommodating a radial offset between the first and second sections 33A, 33B of the outer raceway.

A slight radial offset is practically inevitable when the split housing is reassembled. Consequently, there is a risk of noise and vibration as the rollers over-roll the first and second interfaces 25A, 25B, as well as a risk of edge stresses. According to the invention, these risks are mitigated by providing a curved profile at the edges of the first and second raceway sections 33A, 33B at the corresponding first and second interfaces.

Figure 3:
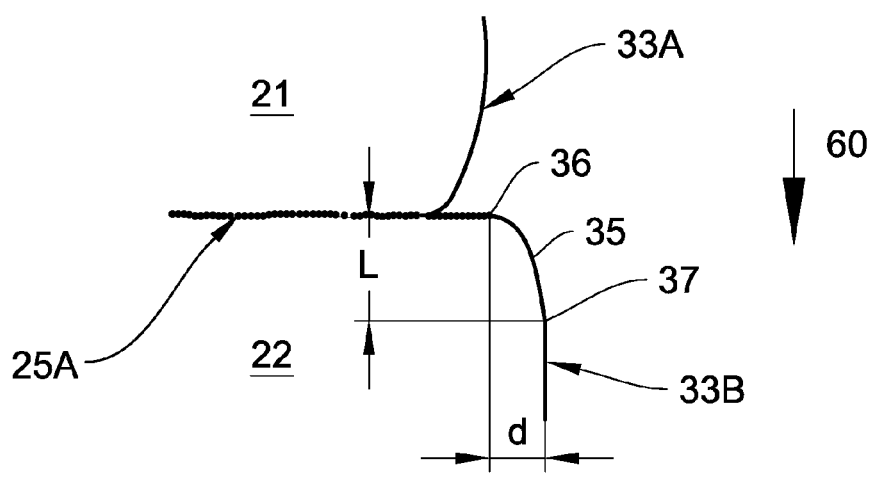
FIG. 3 is an exploded view of a detail from FIG. 2, showing an interface where the first and second halves of the housing adjoin.

A detail of the first interface 25A is shown in FIG. 3. As may be seen from this figure, a roller moving in the direction indicated by the arrow 60 encounters a height difference at the first interface 25A. To prevent an impact with an edge of the second raceway portion 35B, the edge 35 has a profiled surface defined between a start point 36 and an end point 37. The start point of the edge profile 35 lies on the plane of the first interface 25A and has a depth d relative to the second outer raceway portion 33B that is at least equal to the radial clearance of the bearing. Consequently, the rollers 31 are unloaded at the interface, reducing noise and vibration. The end point 37 of the edge profile surface lies on the second outer raceway portion 35B, and is situated at a length L from the start point 36 (in circumferential direction), which is at least equal to twice the radial clearance. Between the start and end points, the edge profile 35 has a logarithmic curvature, which minimizes edge stresses and also helps to reduce noise and vibration. The edge profile is created using an electrochemical machining processes, which enables the logarithmic curvature to be realized with precision. Suitably, each edge of the two ring halves is provided with such an edge profile, A number of aspects/embodiments of the invention have been described. It is to be understood that each aspect/embodiment may be combined with any other aspect/embodiment. Moreover the invention is not restricted to the described embodiments, but may be varied within the scope of the accompanying patent claims.

REFERENCE NUMERALS

10 Crankshaft
12 Shaft section of crankshaft
15 Crank webs
20 Housing
21 First housing part
22 Second housing part
25A First interface between housing parts
25B Second interlace between housing parts
30 Toroidal roller bearing
31 Toroidal rollers
32 Inner raceway
33A First portion of outer raceway
33B Second portion of outer raceway
35 Edge profile on outer raceway portion
36 Start point of edge profile
37 End point of edge profile
40 Cage
50 Bolts
60 Direction of rolling

The invention claimed is:

1. An assembly comprising a crankshaft having a plurality of shaft sections, wherein at least one shaft section of the plurality of shaft sections is rotationally supported relative to a housing by a bearing having an outer ring which is split into two ring halves in a radial direction and includes a first outer raceway portion and a second outer raceway portion, wherein the bearing which supports the at least one shaft section is a toroidal roller bearing that comprises a plurality of toroidal rollers, and wherein the toroidal roller bearing has a pitch circle diameter D and the plurality of toroidal rollers have a radius of curvature R according to the following equation:

$$1.5D < R < 2.5D.$$

2. The assembly according to claim 1, wherein the radius of curvature R of the plurality of toroidal rollers is equal to 2D.

3. The assembly according to claim 1, wherein an inner ring of the toroidal roller bearing is formed directly by the at least one shaft section of the crankshaft, the at least one shaft section having a concave surface that forms an inner raceway for the plurality of toroidal rollers.

4. The assembly according to claim 1, wherein:
the two ring halves of the outer ring of the toroidal roller bearing are formed by a first part and a second part of the housing;
a radially inner surface of the first part has a concave surface that forms the first outer raceway portion; and
a radially inner surface of the second part has a concave surface that forms the second outer raceway portion.

5. The assembly according to claim 1, wherein the toroidal roller bearing has a radial clearance that is a maximum amount by which an inner ring can be displaced in a radial direction relative to the outer ring, the radial clearance being between 0.03 mm and 0.08 mm.

6. The assembly according to claim 5, wherein:
at an interface between the first and second outer ring halves, one ring half of the two ring halves is provided with an edge profile having a curved surface when viewed in an axial direction; wherein
the curved surface is defined between a start point and an endpoint;
the start point of the edge profile on the one ring half is located on a plane of the interface, and has a depth (d) relative to the outer raceway portion of the one ring half that is equal to or greater than the radial clearance; wherein
the end point of the edge profile on the one ring half is located on the outer raceway portion of the one ring half, at a distance (L) from the start point in a circumferential direction, the distance (L) being equal to at least twice the radial clearance of the toroidal roller bearing; and wherein
the curved surface of the edge profile has a curvature between the start point and the end point, created by an electrochemical machining process.

7. A method of manufacturing a rolling element bearing for supporting a shaft section of a crankshaft with the bearing having a maximum radial clearance, C, the method comprising steps of:
providing a bearing outer ring;
splitting the bearing outer ring in a radial direction to form a first ring half and a second ring half;
providing an edge profile along a split edge of at least one of the first and second ring halves,
wherein
the step of providing the edge profile is carried out by electrochemical machining.

8. The method of manufacturing a rolling element bearing according to claim 7, wherein the edge profile has a curved surface, defined between a start point and an end point along the split edge, the curved surface has a curvature between the start point and the end point; the start point of the edge profile on the at least one of the first and second ring halves lies on a plane of an interface and has a depth (d) relative to an outer raceway portion of the at least one of the first and second ring halves which is at least equal to a maximum internal radial clearance of the bearing.

* * * * *